United States Patent [19]

Tödtemann et al.

[11] Patent Number: 4,788,238

[45] Date of Patent: Nov. 29, 1988

[54] THERMOPLASTIC MOULDING COMPOSITIONS HAVING FLAME-RETARDANT PROPERTIES

[75] Inventors: Gert Tödtemann; Klaus Reinking, both of Wermelskirchen; Otto Koch, Cologne; Kress Hans-Jürgen, Krefeld; Lindner Christian, Koeln Friedemann Müller, Neuss; Horst Peters, Leverkusen; Josef Buekers, Krefeld, all of Fed. Rep. of Germany

[73] Assignee: Bayer Aktiengesellschaft, Leverkusen, Fed. Rep. of Germany

[21] Appl. No.: 99,100

[22] Filed: Sep. 21, 1987

Related U.S. Application Data

[63] Continuation of Ser. No. 797,408, Nov. 12, 1985, abandoned.

[30] Foreign Application Priority Data

Dec. 8, 1984 [DE] Fed. Rep. of Germany ....... 3444868

[51] Int. Cl.$^4$ ............................ C08K 5/51; C08K 5/52; C08K 5/53
[52] U.S. Cl. .................... 524/130; 524/132; 524/135; 524/139; 524/140; 524/141; 524/142; 524/144; 524/511; 524/520
[58] Field of Search ............... 524/130, 132, 135, 139, 524/140, 141, 142, 144, 511, 520; 525/67, 132, 146, 147, 148

[56] References Cited

U.S. PATENT DOCUMENTS

| 3,673,278 | 6/1972 | Bialous | 525/148 |
| 3,787,529 | 1/1974 | Benghiat | 524/130 |
| 3,809,676 | 5/1974 | Liberti | 524/135 |
| 4,409,363 | 10/1983 | Brandstetter et al. | 525/67 |
| 4,463,130 | 7/1984 | Serini et al. | 525/67 |
| 4,474,914 | 10/1984 | Spivack | 524/134 |
| 4,649,168 | 3/1987 | Kress et al. | 524/132 |
| 4,657,955 | 4/1987 | Kress et al. | 524/130 |
| 4,692,488 | 9/1987 | Kress et al. | 524/139 |
| 4,721,774 | 1/1988 | Todtemann et al. | 524/139 |

FOREIGN PATENT DOCUMENTS

3516807 11/1986 Fed. Rep. of Germany ...... 524/130

*Primary Examiner*—Kriellion Morgan
*Attorney, Agent, or Firm*—Connolly and Hutz

[57] ABSTRACT

The present invention provides thermoplastic flame-retardant moulding compositions containing halogen-containing copolycarbonates, styrene/maleic anhydride copolymers, phosphorus compounds of the formula (I)

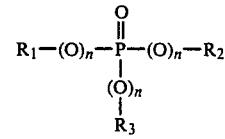

and tetrafluoroethylene polymers and, if desired, further known additives.

8 Claims, No Drawings

THERMOPLASTIC MOULDING COMPOSITIONS HAVING FLAME-RETARDANT PROPERTIES

This is a continuation of application Ser. No. 797,408, filed Nov. 12, 1985, now abandoned.

Alloys of 50-95% by weight of aromatic polycarbonates and 95 to 5% by weight of styrene/maleic anhydride copolymers including 5-30% by weight of polymerised maleic anhydride are thermoplastic moulding compositions which are far superior to the polycarbonates (which they resemble in most technological properties), especially in stability to hot water and in the fluency of the melts in the course of thermoplastic processing (DE-OS [German Published Specification] No. 2,252,974).

However, alloys of aromatic polycarbonates and styrene/maleic anhydride copolymers have a significant disadvantage in that they do not meet the customary flammability tests, for example the flammability tests in accordance with UL, Subj. 94.

It is true that this disadvantage can be eliminated by incorporating suitable fireproofing systems, for example aromatic bromine compounds and antimony trioxide (see U.S. Pat. No. 4,151,218), but the use of metal oxide compounds as flameproofing synergists brings with it disadvantages, for example difficulties in processability, in particular at high temperatures. Mouldings therefrom occasionally have an inadequate surface, for example microcracks or streaks.

It is therefore the object of the present invention to develop flame-retardant polycarbonate alloys of the abovementioned type, which do not have these disadvantages.

The present invention therefore provides thermoplastic moulding compositions containing a. 50-90 parts by weight of a halogen-containing copolycarbonate from a dihydric phenol and a dihydric halogenated, preferably brominated, phenol, the copolycarbonate containing 3-20% by weight of halogen, in particular bromine, in the form of cocondensed halogenated dihydric phenols, b. 10-50 parts by weight of a copolymer of random structure from b1. 95-70% by weight, preferably 90-75% by weight, of styrene, α-methyl-styrene, ring-alkylated styrene or mixtures of said vinyl aromatics and b2. 5-30% by weight, preferably 10-25% by weight, of maleic anhydride, c. 1-20 parts by weight, preferably 5-15 parts by weight, relative to 100 parts total weight of (a)+(b), of a phosphorus compound of the formula (I)

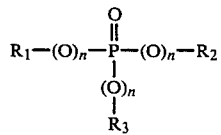

wherein

R$_1$, R$_2$ and R$_3$, independently of one another, are an optionally halogenated C$_1$-C$_8$-alkyl or an optionally halogenated C$_6$-C$_{20}$-aryl and n stands for 0 or 1, and d. 0.05-5 parts by weight, in particular 0.1-1 part by weight, again relative to 100 parts total weight of (a)+(b), of a tetrafluoroethylene polymer.

The thermoplastic moulding compositions according to the invention can additionally contain, as component (e), organic halogen compounds which are suitable as flameproofing agents for polycarbonates or for styrene maleic anhydride copolymers in amounts of up to 12 parts by weight, again relative to 100 parts total weight of (a)+(b), as well as, if desired, further known additives such as stabilisers, pigments, flow-control agents, mould release agents and/or antistats.

Suitable according to the invention as thermoplastic, aromatic copolycarbonates of the type defined as component (a) are those based on diphenols of the formula (II)

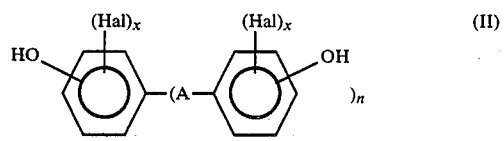

wherein

A is a single bond, a C$_1$-C$_5$-alkylene, a C$_2$-C$_5$-alkylidene, a C$_5$-C$_6$-cycloalkylidene, —S— or —SO$_3$—, Hal, is chlorine or bromine, x is 0, 1 or 2 and "n" is 1 or zero, the copolycarbonate in accordance with component (a) containing 3-20% by weight of halogen, in particular bromine, in the form of cocondensed halogenated diphenols.

The diphenols of the formula (II) are either known from the literature or can be prepared by methods known from the literature.

Suitable diphenols of the formula (II) are for example hydroquinone, resorcinol, 4,4'-dihydroxydiphenyl, 2,2-bis-(4-hydroxyphenyl)-propane, 2,4-bis-(4-hydroxyphenyl)-b 2-methylbutane, 1,1-bis-(4-hydroxyphenyl)-cyclohexane, 2,2-bis-(3-chloro-4-hydroxyphenyl)-propane and 2,2-bis-(3,5-dibromo-4-hydroxyphenyl)-propane.

Preferred diphenols of the formula (II) are 2,2-bis-(4-hydroxyphenyl)-propane, 2,2-bis-(3,5-dichloro-4-hydroxy-phenyl)-propane, 2,2-bis-(3,5-dibromo-4-hydroxyphenyl)-propane and 1,1-bis-(4-hydroxyphenyl)-cyclohexane.

The preparation of polycarbonates suitable according to the invention as component (a) is known from the literature and can be effected for example with phosgene by the phase interface method or with phosgene by the homogeneous phase method (the so-called pyridine method), in which the molecular weight to be set in each case is obtained in known manner by means of an appropriate amount of known chain terminators.

Polycarbonates suitable according to the invention as component (a) have average weight average molecular weights ($\overline{M}w$, for example measured by ultracentrifugation or scattered light measurement) of 10,000-200,000, preferably of 20,000-80,000.

Polycarbonates suitable according to the invention as component (a) can be branched in known manner, preferably by the incorporation of 0.05-2.0 mol %, relative to the total amount of diphenols used, of trifunctional or more than trifunctional compounds, for example those having three or more than three phenolic OH groups.

Preferred copolycarbonates are copolycarbonates based on bisphenol A with up to 15% by weight, relative to the total amount of diphenoles, of bis-(3,5-dibromo-4-hydroxyphenyl)-propane.

Copolymers suitable according to the invention as component (b) are of random structure. Such random structure copolymers can be preferably prepared from the corresponding monomers by continuous mass or solution polymerisation with incomplete conversions.

Suitable ring-alkylated styrenes are for example p-methylstyrene, vinyl toluene, 2,4-dimethylstyrene and mixtures thereof.

The molecular weights of random structure styrene/maleic anhydride copolymers suitable according to the invention as component (b) can vary over a wide range. Preferably these products have a limiting viscosity number $[\eta]$ of 0.4–0.9 (measured at 25° C. in dimethylformamide; see also Hoffmann, Krömer, Kuhn, Polymeranalytik I [Analysis of polymers I], Stuttgart 1977, page 316 et seq.).

The phosphorus compounds to be used according to the invention as component (c) are common knowledge (see for example Ullmann, Enzyklopädie der technischen Chemie [Encyclopaedia of Chemical Technology], volume 18, page 301 et seq., 1979).

Optionally halogenated $C_1$–$C_8$-alkyl radicals as per $R_1$, $R_2$ or $R_3$ of the formula (I) are 2-chloroethyl, 2,3-dibromopropyl and 2,3-dichloropropyl; optionally halogenated $C_6$–$C_{20}$-aryl radicals as per $R_1$, $R_2$ or $R_3$ of the formula (I) are chlorophenyl, bromophenyl, pentachlorophenyl, pentabromophenyl, phenyl, cresyl, isopropylphenyl and naphthyl.

Phosphorus compounds of the formula (I) which are suitable according to the invention are tributyl phosphate, tris-(2-chloroethyl) phosphate, tris-(2,3-dibromopropyl) phosphate, triphenyl phosphate, tricresyl phosphate, diphenyl cresyl phosphate, diphenyl octyl phosphate, diphenyl 2-ethylcresyl phosphate, tri(isopropylphenyl) phosphate, halogen-substituted aryl phosphates, dimethyl methanephosphonates, diphenyl methanephosphonates, diethyl phenylphosphonates, triphenyl phosphine oxide and tricresylphosphine oxide.

Tetrafluoroethylene polymers suitable according to the invention as component (d) are polymers having fluorine contents of 65–76% by weight, preferably 70 to 76% by weight. Examples are polytetrafluoroethylene, tetrafluoroethylene-hexafluoropropylene copolymers or tetrafluoroethylene copolymers with low amounts of fluorine-free copolymerisable ethylenically unsaturated monomers. The polymers are known. They can be prepared by known methods, for example by polymerising tetrafluoroethylene in an aqueous medium with a catalyst which forms free radicals, for example with sodium peroxodisulphate, potassium peroxodisulphate or ammonium peroxodisulphate, at pressures of 7–71 kg/cm$^2$ and at temperatures of 0°–200° C., preferably at temperatures of 20°–100° C. (for more details see for example U.S. Pat. No. 2,393,967). The density of these materials is preferably within the range from 2.0 to 2.3 g/cm$^3$, and the particle sizes are within the range from 100 to 1000 μm.

Organic halogen compounds which are suitable as the flameproofing agent component (e) are in principle all those which, in the course of the preparation and the processing of the moulding compositions according to the invention, are non-volatile and thermally stable, i.e. those which do not split off halogen in the course thereof, and thus can exert their flameproofing action in the event of a fire. Particularly suitable are decabromoidiphenyl ether, octabromodiphenyl, octabromodiphenyl ether and tribromotetrachlorotoluene, and also oligomeric bromine compounds, such as, for example, oligocarbonates based on tetrabromobisphenol A, and finally also polymeric bromine compounds, such as, for example, high-molecular ring-brominated polyphenylene oxides.

The moulding compositions according to the invention, which contain components (a), (b), (c), (d), if desired (e) and if desired further known additives such as stabilisers, pigments, flow-control agents, mould release agents and/or antistats, are prepared by mixing the respective components in known manner and melt-compounding or melt-extruding at temperatures of 200°–330° C. in conventional machines, such as internal kneaders, extruders or twin-shaft screws, or by mixing the solutions of the respective components in suitable organic solvents, for example in chlorobenzene, and evaporating the solvent mixtures in conventional machines, for example in evaporation extruders.

The present invention thus also provides a process for preparing thermoplastic moulding compositions containing components (a), (b), (c), (d), if desired component (e) and if desired stabilisers, pigments, flow-control agents, mould release agents and/or antistats, which is characterised in that components (a), (b), (c), (d), if desired component (e) and if desired stabilisers, pigments, flow-control agents, mould release agents and/or antistats are mixed and at temperatures of 200°–330° C. are melt-compounded or melt-extruded in customary machines, or in that solutions of these components in suitable organic solvents are mixed and evaporated in customary machines.

The individual components can be mixed in known manner not only successively but also simultaneously, not only at about 20° C. (room temperature) but also at elevated temperature.

The moulding compositions of the present invention can be used for preparing mouldings of any kind. In particular, mouldings can be prepared by injection moulding. Examples of mouldings which can be prepared are: housing components of any kind (for example for domestic appliances, such as juicers, coffee machines, mixers) or cover slabs for the building sector and components for the motor vehicle sector. They are also used in the field of electrical engineering since they have very good electrical properties.

A further form of processing is the preparation of mouldings by deep-drawing from previously prepared sheets or films.

EXAMPLES

Alloy components used a. A copolycarbonate consisting of bisphenol A and 10% by weight of tetrabromobisphenol A, referred to the total weight of the copolycarbonate, and having a relative solution viscosity of 1.284, measured in $CH_2Cl_2$ at 25° C. and at a concentration of 0.5 g/l, bromine content: 5% by weight.

b. Preparation of the copolymer resins. 750 parts mixture having a composition in accordance with Table 1 are presented in a jacketed vessel which is equipped with an internal thermometer, a stirrer and an inlet and an outlet, and are heated to 130° C. A monomer stream of 1100 parts of the same composition is then metered in and the same amount of polymer solution is removed from the vessel in such a way that the level of liquid in the vessel is maintained. The monomer stream has continually added to it about 0.05 part per hour of tert.-butyl perpivalate (75% strength in dibutyl phthalate). After about 2 h a constant conversion of about 40% has become established. The polymer solution has added to it 0.1% by weight of 2,5-di-t-butyl-p-cresol and is subsequently freed on a vaporisation extruder from monomers aod liquid components. The respective limiting viscosity numbers as determined by measurement at 25° C. in dimethylformamide are listed in Table 1.

TABLE 1

| | Composition of starting monomers and of copolymers (b) | | | | |
|---|---|---|---|---|---|
| | Starting monomer % by weight | | Copolymer % by weight | | |
| | Styrene | Maleic anhydride | Styrene | Maleic anhydride | Limiting viscosity numbers of the copolymer [η] |
| (b)(1) | 95.5 | 4.4 | 89 | 11 | 0.499 |
| (b)(2) | 93.2 | 6.8 | 83 | 17 | 0.518 |
| (b)(3) | 92.0 | 8.0 | 80 | 20 | 0.503 | c. Diphenyl cresyl phosphate
d. Polytetrafluoroethylene in powder form having a particle size of 500–650 μm (Hostaflon TF 2026 from the firm of Hoechst)

The compounding of components (a), (b)(1) to (b)(3), (c) and (d) was effected on a twin-shaft extruder (ZSK 32 from the firm of Wener & Pfleiderer) at temperatures between 230° and 250° C.

The preparation of the mouldings was effected on an injection moulding machine at 250° C.

The flammability properties of samples was measured in test specimen thicknesses of 1.6 and 3.2 mm in accordance with UL-subj. 94 V. The UL 94 V test is carried out as follows:

Samples of the substance are moulded into rods measuring 127×12.7×1.6 mm and 127×12.7×3.2 mm. The rods are mounted vertically in such a way that the underside of the test specimen is situated 305 mm above a strip of surgical dressing material. Each sample rod is individually ignited by means of two successive ignition processes of 10 sec. duration. The burn properties after each ignition process are observed and are used to evaluate the sample. The sample is ignited by means of a Bunsen burner with a 10 mm (⅜ inch) high blue flame of natural gas having a heat content of $3.73 \times 10^4$ kJ/m³ (1,000 BTU per cubic foot).

The UL 94 V-0 classification comprises the properties described hereinafter of materials which were tested in accordance with the UL 94 standard. The materials in this class contain no samples which burn for longer than 10 sec after each impingement of the test flame; their total burn time is less than 50 sec for the twofold impingement of the flame on each set of samples; they do not contain samples which burn off completely up to the support bracket attached at the other end of the sample; they do not have samples which ignite the cottonwool arranged beneath the sample through burning drops or particles; nor do they contain samples which glow for longer than 30 sec. after removal of the test flame.

Other UL 94 classifications are for samples which have a longer afterburn time (classification V-1) or which additionally give off burning drops or particles which ignite the cottonwool arranged underneath the sample (classification V-2). The classification "n.p." stands for "not passed" and means that the samples have an afterburn time of ≧30 sec.

The following table reveals the exact compositions of the tested moulding compositions and the UL 94 classifications obtained:

| | % by weight | | | | | | UL 94 V 3.2 mm | UL 94 V 1.6 mm |
|---|---|---|---|---|---|---|---|---|
| | (a) | (b)(1) | (b)(2) | (b)(3) | (c) | (d) | | |
| @ Comparative Experiments | | | | | | | | |
| V1 | 70 | 30 | | | | | n.p | n.p |
| V2 | 70 | | 30 | | | | n.p | n.p |
| V3 | 70 | | | 30 | | | n.p | n.p |
| @ Experiments of the present invention | | | | | | | | |
| E1 | 70 | 30 | | | 5 | 0.2 | V0 | V1 |
| E2 | 70 | | 30 | | 5 | 0.2 | V0 | V0 |
| E3 | 70 | | | 30 | 3 | 0.2 | V0 | V1 |

We claim:
1. Thermoplastic moulding compositions consisting essentially of:
(A) 50–90 parts by weight of a halogen-containing copolycarbonate from a dihydric phenol and a dehydric halogenated phenol of the formula (II)

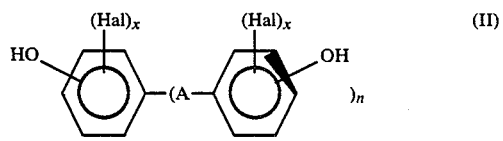

wherein
A is a single bond, a $C_1$–$C_5$-alkylene, a $C_2$–$C_5$-alkylidene, a $C_5$–$C_6$-cycloalkylidene, —S— or $SO_2$—,
Hal is chlorine or bromine,
x is 0, 1 or 2 and
n is 1 or zero,
said copolycarbonate containing 3–20% by weight of halogen in the form of cocondensed, halogenated diphenols,
(b) 10–50 parts by weight of copolymer of random structure from (b)(i) 95–70% by weight of styrene, alpha-methylstyrene, ring-alkylated styrene or mixtures of said vinyl aromatics and (b)(ii) 5–30% by weight of maleic anhydride, (c) 1–20 parts by weight, relative to 100 parts total weight of (a)+(b), of a dimethyl methanephosphonate, diphenyl methanephosphonate, diethyl phenyl phosphonate, or a phosphorus compound of the formula (I)

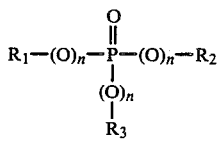

wherein $R_1$, $R_2$, and $R_3$, independently of one another, are optionally halogenated $C_1$–$C_8$-alkyl an optionally halogenated $C_6$–$C_{20}$-aryl, and n stands for 0 or 1, and (d) 0.05–5 parts by weight, again relative to 100 parts total weight of (a)+(b), of a tetrafluoroethylene polymer having a particle size of 100 to 1,000 μm.

2. Thermoplastic moulding compositions according to claim 1, characterised in that they contain, as component e, up to 12 parts by weight, again relative to 100 parts total weight of (a)+(b), suitable organic halogen compounds as flameproofing agents.

3. Thermoplastic moulding compositions according to claim 1, characterised in that they additionally contain at least one additive selected from the group comprising stabilisers, pigments, flow-control agents, mould release agents and antistats.

4. Process for preparing the moulding compositions of claim 1 characterised in that components (a), (b), (c), (d) and if desired (e) are mixed and are melt-compounded or melt-extruded at temperatures of 200° C. to 330° C. in customary machines.

5. Process for preparing the moulding compositions of claim 1, characterised in that components (a), (b), (c), (d) and if desired (e) are mixed in suitable organic solvents and the solvent mixtures are than evaporated in customary evaporators.

6. Process according to claim 4, characterised in that at least one additive selected from the group comprising stabilisers, pigments, flow-control agents, mould release agents and antistats is included.

7. Thermoplastic moulding compositions according to claim 1 wherein the amount of component (c) is 5–15 parts by weight, relative to 100 parts total weight of (a)+(b).

8. Thermoplastic moulding compositions according to claim 1 wherein the halogen-containing copolycarbonate of component (a) is a brominated copolycarbonate.

* * * * *